US010372524B2

(12) United States Patent
Shivaji et al.

(10) Patent No.: US 10,372,524 B2
(45) Date of Patent: Aug. 6, 2019

(54) STORAGE ANOMALY DETECTION

(71) Applicant: HGST Netherlands B.V., Amsterdam (NL)

(72) Inventors: Shivkumar Shivaji, Fremont, CA (US); Ryan Sudhakaran, Fremont, CA (US); Yong Bum Lee, Palo Alto, CA (US); Joel Barajas Zamora, Sunnyvale, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/222,854

(22) Filed: Jul. 28, 2016

(65) Prior Publication Data

US 2018/0032385 A1     Feb. 1, 2018

(51) Int. Cl.
*G06F 11/07*        (2006.01)
*G06F 11/34*        (2006.01)

(52) U.S. Cl.
CPC ........ *G06F 11/079* (2013.01); *G06F 11/0727* (2013.01); *G06F 11/0751* (2013.01); *G06F 11/3409* (2013.01); *G06F 11/3452* (2013.01)

(58) Field of Classification Search
CPC .. G06F 11/076; G06F 11/092; G06F 11/1461; G06F 11/34; G06F 11/0727; G06F 3/0653; G06F 3/067; G06F 3/0673; G06F 3/0685
See application file for complete search history.

(56) References Cited

U.S. PATENT DOCUMENTS

| | | | | |
|---|---|---|---|---|
| 7,587,296 B2 * | 9/2009 | Harvey, Jr. | ...... | G05B 19/41875 702/179 |
| 8,554,699 B2 * | 10/2013 | Ruhl | ................... | G06F 17/3089 706/12 |
| 8,583,584 B2 * | 11/2013 | Ruhl | ...................... | G06N 5/048 706/52 |
| 9,395,938 B2 * | 7/2016 | Tsukahara | ............. | G06F 3/0619 |

(Continued)

OTHER PUBLICATIONS

Hyndman, Rob J. et al. "Large-Scale Unusual Time Series Detection" dated 2015, 4 pages, IEEE International Conference.

(Continued)

*Primary Examiner* — Nadeem Iqbal
(74) *Attorney, Agent, or Firm* — Patent Law Works LLP

(57) ABSTRACT

The technology described in this document is, among other things, capable of efficiently monitoring storage device signal data for anomalies. In an example method, signal data for a plurality of non-transitory storage devices is collected. The method determines a hyper feature representation from the collected signal data and computes, using the hyper feature representation, scores for statistics associated with the non-transitory storage devices. The method further determines a reduced hyper feature representation aggregating the scores for each of the statistics associated with each of the non-transitory storage devices; generates, using the reduced hyper feature representation, storage device scores for the non-transitory storage devices of the plurality, respectively; and identifies one or more non-transitory storage devices from among the plurality of non-transitory storage devices exhibiting anomalous storage device behavior using the storage device scores.

23 Claims, 11 Drawing Sheets

(56) References Cited

U.S. PATENT DOCUMENTS

| | | | | |
|---|---|---|---|---|
| 2009/0164171 A1* | 6/2009 | Wold | ............... | G06F 17/18 |
| | | | | 702/179 |
| 2011/0246409 A1* | 10/2011 | Mitra | ............... | G06F 17/18 |
| | | | | 706/52 |
| 2014/0006325 A1* | 1/2014 | Biem | ............ | G06F 11/0751 |
| | | | | 706/46 |
| 2014/0012901 A1* | 1/2014 | Ruhl | ............ | G06F 17/3089 |
| | | | | 709/203 |
| 2015/0269050 A1* | 9/2015 | Filimonov | ......... | G06F 11/3409 |
| | | | | 702/183 |
| 2016/0147585 A1 | 5/2016 | Konig et al. | | |

OTHER PUBLICATIONS

Filzmoser, Peter et al "Package 'pcaPP'", dated Feb. 20, 2015, 29 pages.
Lopez, Javier "Package 'tsoutliers'", dated Feb. 20, 2015, 27 pages.
International Search Report and Written Opinion, PCT/US2017/034857, dated Aug. 30, 2017 (17 pages).

* cited by examiner

STORAGE ANOMALY DETECTION

BACKGROUND

This application relates to anomaly detection in storage devices.

Enterprise computer systems, datacenters, and other critical systems are generally expected to be online and accessible at any time. Any unplanned outages, data loss, and other failures often result in significant operational costs, negative publicity, and revenue losses. To increase uptime and reduce the probability of system failure, administrators often monitor data and signals processed by the components of the systems for anomalies and attempt to address them before they become critical in nature.

However, as the data processing and data storage capabilities of such systems increase year over year, the amount of data processed by the systems has reduced the effectiveness of current techniques to adequately monitor, predict, and address unusual behavior. For example, current large internet companies have banks of servers (such as e-mail servers, cloud storage servers, etc.) that are continuously monitored. Many measurements on server performance are collected every hour for each of thousands of servers. It is particularly challenging to process this volume of data for unusual behavior and then isolate it to a particular computing system or component.

Monitored signals are often analyzed as time series, which can change dynamically over time. Existing solutions attempt to flag independent time series as anomalous in various different domains. For instance, solutions attempt to detect anomalous units represented by a single time series. These existing solutions use various techniques (such as feature extraction, feature space dimensional reduction, and unit anomalous scoring) to identify and process anomalous time series. However, the features extracted using these time series techniques are typically difficult to interpret and associate with a given system component, such as a storage device.

As a result, these existing solutions are generally unable to automatically identify the components that require attention based on potential signal imbalances or unusual values for given time windows of interest or provide reliable insights about or reasoning behind any anomalous behavior.

SUMMARY

According to one innovative aspect of the subject matter being described in this disclosure, a system includes one or more processors and one or more memories. The one or more memories store instructions that, when executed by the one or more processors, cause the system to perform operations comprising: collecting signal data for a plurality of non-transitory storage devices, the signal data including time series for statistics associated with each of the non-transitory storage devices; determining a hyper feature representation from the collected signal data; computing, using the hyper feature representation, scores for each of the statistics associated with each of the non-transitory storage devices; determining a reduced hyper feature representation aggregating the scores for each of the statistics associated with each of the non-transitory storage devices; generating, using the reduced hyper feature representation, storage device scores for the non-transitory storage devices of the plurality, respectively; and identifying one or more non-transitory storage devices from among the plurality of non-transitory storage devices exhibiting anomalous storage device behavior using the storage device scores.

In general, another innovative aspect of the subject matter described in this disclosure may be embodied in methods that include collecting, at one or more computing devices, signal data for a plurality of non-transitory storage devices, the signal data including time series for statistics associated with each of the non-transitory storage devices; determining, using the one or more computing devices, a hyper feature representation from the collected signal data; computing, using the one or more computing devices and the hyper feature representation, scores for each of the statistics associated with each of the non-transitory storage devices; determining, using the one or more computing devices, a reduced hyper feature representation aggregating the scores for each of the statistics associated with each of the non-transitory storage devices; generating, using the one or more computing devices and the reduced hyper feature representation, storage device scores for the non-transitory storage devices of the plurality, respectively; and identifying, using the one or more computing devices, one or more non-transitory storage devices from among the plurality of non-transitory storage devices exhibiting anomalous storage device behavior using the storage device scores.

Other innovative aspects include corresponding systems, methods, apparatus, and computer program products.

These and other implementations may each optionally include one or more of the following features, such as: ranking the non-transitory storage devices using the storage device scores; generating analytics identifying regions of interest for each of the non-transitory storage devices; providing the analytics for presentation by a client device of a stakeholder; that the hyper feature representation is a two-dimensional matrix including each of the time series for each of the statistics associated with each of the non-transitory storage devices; that the storage device scores are feature vectors having dimensions equal to a number of statistics used to determine the scores; that each feature vector of the feature vectors includes a ranking of the statistics corresponding to that feature vector; that computing the scores for each of the statistics associated with each of the non-transitory storage devices includes performing hierarchical clustering to determine statistical significance of statistical values of the statistics; that computing the scores for each of the statistics associated with each of the non-transitory storage devices includes fitting a multivariate t distribution to the scores in the hyper feature representation; that the hyper feature representation is determined using principal component analysis (PCA) while preserving the time series of the statistics associated with each of the non-transitory storage devices; and that the reduced hyper feature representation is determined using PCA.

The technology can advantageously detect and flag specific storage devices that are exhibiting outlier behavior, as opposed to other solutions that are capable of detecting only time series outliers. The technology can also aggregate unusual scores from multiple time series available for each storage device. Further example benefits and advantages are described below.

This Summary is provided to introduce an example selection of concepts that are further described below in the Detailed Description. This Summary is not intended to identify specific key or essential features of the claimed subject matter, nor is it intended to be used as an aid in determining the scope of the claimed subject matter.

BRIEF DESCRIPTION OF THE DRAWINGS

The disclosure is illustrated by way of example, and not by way of limitation, in the figures of the accompanying drawings in which like reference numerals are used to refer to similar elements.

DETAILED DESCRIPTION

The technology described in this document is capable of efficiently monitoring signal data for anomalies. An anomaly occurs when signal data associated with a metric deviates from a norm, such as a steady state or standard. A metric may be represented by one or more time series. A time series comprises a sequence of data points over a time interval. The data points may be equally or unequally spaced within the time series. A homogenous group of time series may be time series representing the same metric.

Metrics may be associated with a storage device, a storage device array, a central processing unit (CPU), a transceiver, other computer hardware components, a server, etc. Example metrics include, but are not limited to, bytes written, bytes read, read commands, write commands, read average file size, write average file size, storage device-level, reads, writes, media errors, and temperature.

The technology is capable of monitoring many (e.g., hundreds of, thousands of, etc.) time series dynamically (e.g., in real-time, near real-time) and evaluating, based on these time series, whether anomalous behavior has occurred. In some embodiments, the technology can learn the steady (normal) state for a group of homogenous time series and detect statistically significant deviations from the steady state. Further, the technology can account for changes in the steady state.

The technology may use a multi-level hierarchical approach to monitor for anomalies. For instance, the technology may use a two-level approach where, at a first level, it identifies a multi-dimensional representation for each storage device metric and scores each storage device based on its distribution in the multi-dimensional representation; and at a second level, aggregates metric scores for each storage device in a multi-dimensional representation and scores each storage device based on its distribution in the multi-dimensional representation. The technology may then identify imbalances based on the storage device scores. In further embodiments, the technology may utilize three or more levels to analyze the storage device signal data.

Using this approach, the technology can advantageously identify the specific computing system components (such as a storage device or storage device array) that require attention, the signals that show unusual patterns, and the time regions of interest. The technology can assist stakeholders by alerting them of storage imbalances, suggesting counter-measures to avoid performance bottlenecks, and predicting and alerting them of imminent or more distant storage device failures.

Figure 1:
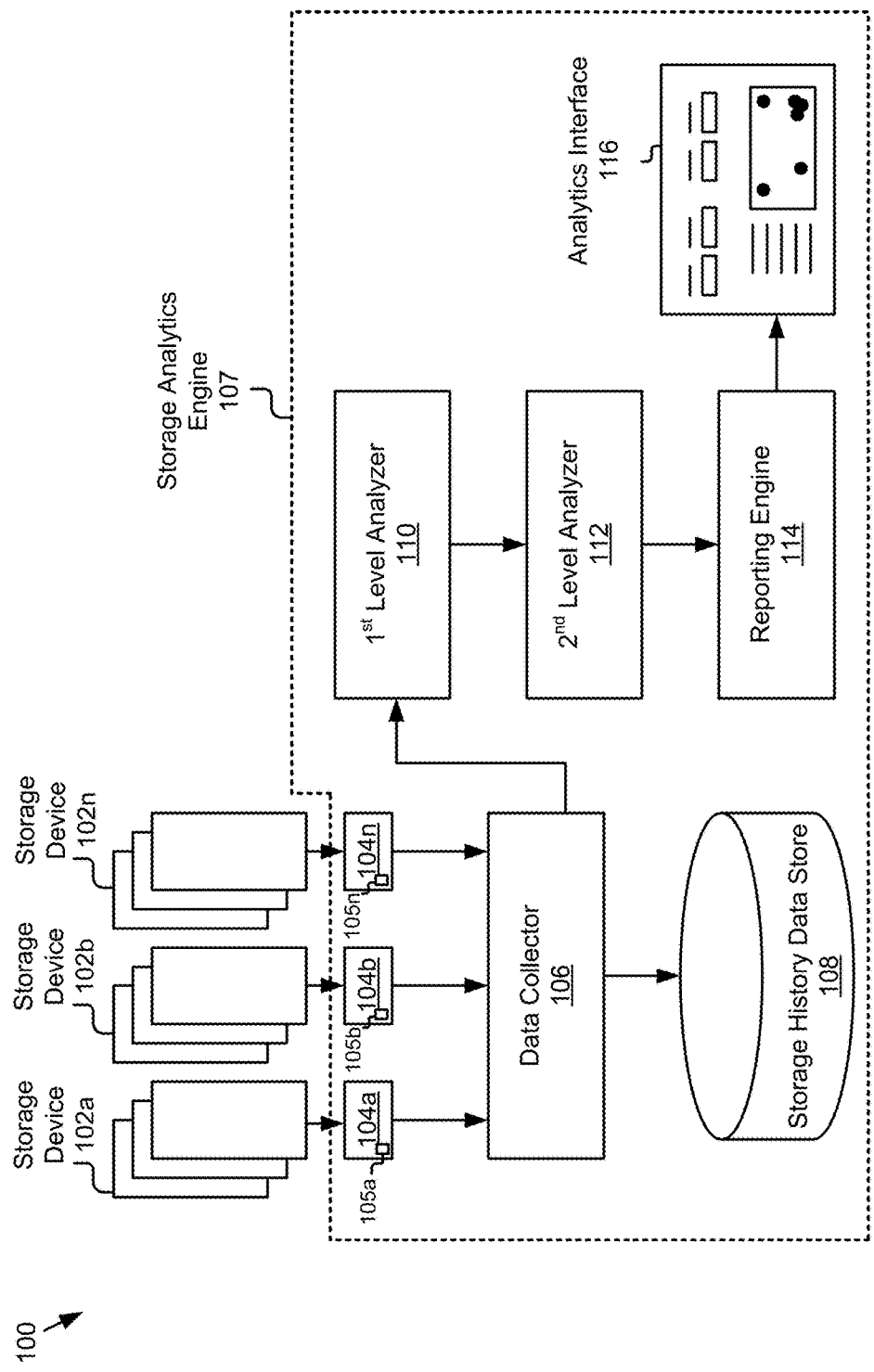
FIG. 1 is a block diagram of an example anomaly detection system.

FIG. 1 is a block diagram of an example anomaly detection system 100. As shown, the system 100 may include a storage analytics engine 107 configured to analyze signal data aggregated from one or more storage devices 102a, 102b, . . . , 102n. A storage device may also be simply referred to as 102. The storage analytics engine 107 may include one or more monitors 105, a data collector 106, a storage history data store 108, one or more analyzers, such as the $1^{st}$ level analyzer 110 and the $2^{nd}$ level analyzer 112, a reporting engine 114, and an analytics interface 116.

A storage device 102 may include one or more non-transitory storage media. A storage device 102 may be a single device or may comprise a plurality of devices. In some embodiments, a storage device 102 includes one or more non-volatile memory devices, such as a solid state storage device, a flash memory device, a read only memory (ROM) device, a magnetic computer storage device (e.g., a hard disk drive), an optical storage device (e.g., digital video disc (DVD), compact disc (CD), Blu-ray, etc.), etc., although other types of suitable computer memory may also be used in further embodiments.

In some embodiments, the storage device 102 may include an array of storage devices configured to storage large volumes of data (e.g., terabytes, petabytes, etc.) in enterprise computing systems. For instance, the storage device 102 may include a disk array mounted in a storage enclosure. For instance, the storage device 102 may be a data center storage rack including a plurality of solid state and/or mechanical hard drives (e.g., 100+).

In some embodiments, a storage device 102 may be coupled to a controller node configured to control the disk array. For example, controller nodes 104a, 104b, . . . , 104n (also simply referred to as 104) may be respectively coupled to and manage the storage devices 102a, 102b, and 102n. In further embodiments, the controller node 104 may be integrated with the storage device 102. Other variations are also possible and contemplated.

A controller node 104 may include a computer processor, a computer memory, input/output (I/O) interfaces, and/or other non-transitory electronics. The controller nodes 104a, 104b, . . . , 104n may include monitors 105a, 105b, . . . , 105n (also simply referred to as 105) configured to signal data from the various sub-components of the storage device(s) 102 and/or the controller nodes 104a, 104b, . . . , 104n themselves. The monitors 105 are configured to relay the signal data to the data collector 106. For example, the monitors 105 may be coupled via a network interface of the controller nodes 104 to communicate the signal data to the data collector 106 via a computer network, such as the network 218 depicted in FIG. 2. The data collector 106 may aggregate signal data from the various storage devices 102 (e.g., via the monitors 105) and store the data in the storage history data store 108 and/or provide it to other components of the system 100 for analysis, such as the $1^{st}$ level analyzer 110. The $1^{st}$ level analyzer 110, the $2^{nd}$ level analyzer 112, the reporting engine 114, and the analytics interface 116 are discussed in further detail below.

The monitor(s) 105, the data collector 106, the one or more analyzers (e.g., $1^{st}$ level analyzer 110, $2^{nd}$ level analyzer 112, etc.), the reporting engine 114, and/or the analytics interface 116 may comprise computer logic (e.g., instructions, software, objects, etc.) stored in non-transitory computer memory device(s) and executable by computer processor(s) to perform the operations discussed herein, such as those discussed below with reference to FIG. 3, for example. In further embodiments, one or more aspects of the monitor(s) 105, the data collector 106, the one or more analyzers (e.g., $1^{st}$ level analyzer 110, $2^{nd}$ level analyzer 112, etc.), the reporting engine 114, and/or the analytics interface 116 may be implemented using hardware, such as, but not limited to, a field-programmable gate array (FPGA), an application-specific integrated circuit (ASIC), etc. Other suitable variations are also possible and contemplated. Further, the monitor(s) 105, the data collector 106, the one or more analyzers (e.g., $1^{st}$ level analyzer, $2^{nd}$ level analyzer, etc.), the reporting engine 114, and/or the analytics interface 116 may be electronically communicatively coupled via one or more processors, interfaces, networks, etc., to exchange data.

The storage analytics engine 107 may be implemented using one or more physical and/or virtual computing devices, such as a hardware server, a virtual server, a server array, and/or any other computing device, or group of computing devices, having data processing, storing, and communication capabilities. In some embodiments, some or all aspects of the storage analytics engine 107 may be virtualized (e.g., using a virtual machine implemented via software) and/or implemented via a cloud-based architecture with computing and storage systems that are dynamically scalable and distributed across a network, such as the network 218. In some instances, the data collector 106, the $1^{st}$ level analyzer 110, and/or the $2^{nd}$ level analyzer 112 are implemented using a scalable, distributed data storage and processing framework, such as Hadoop™, although other suitable frameworks may also be utilized.

Figure 2:
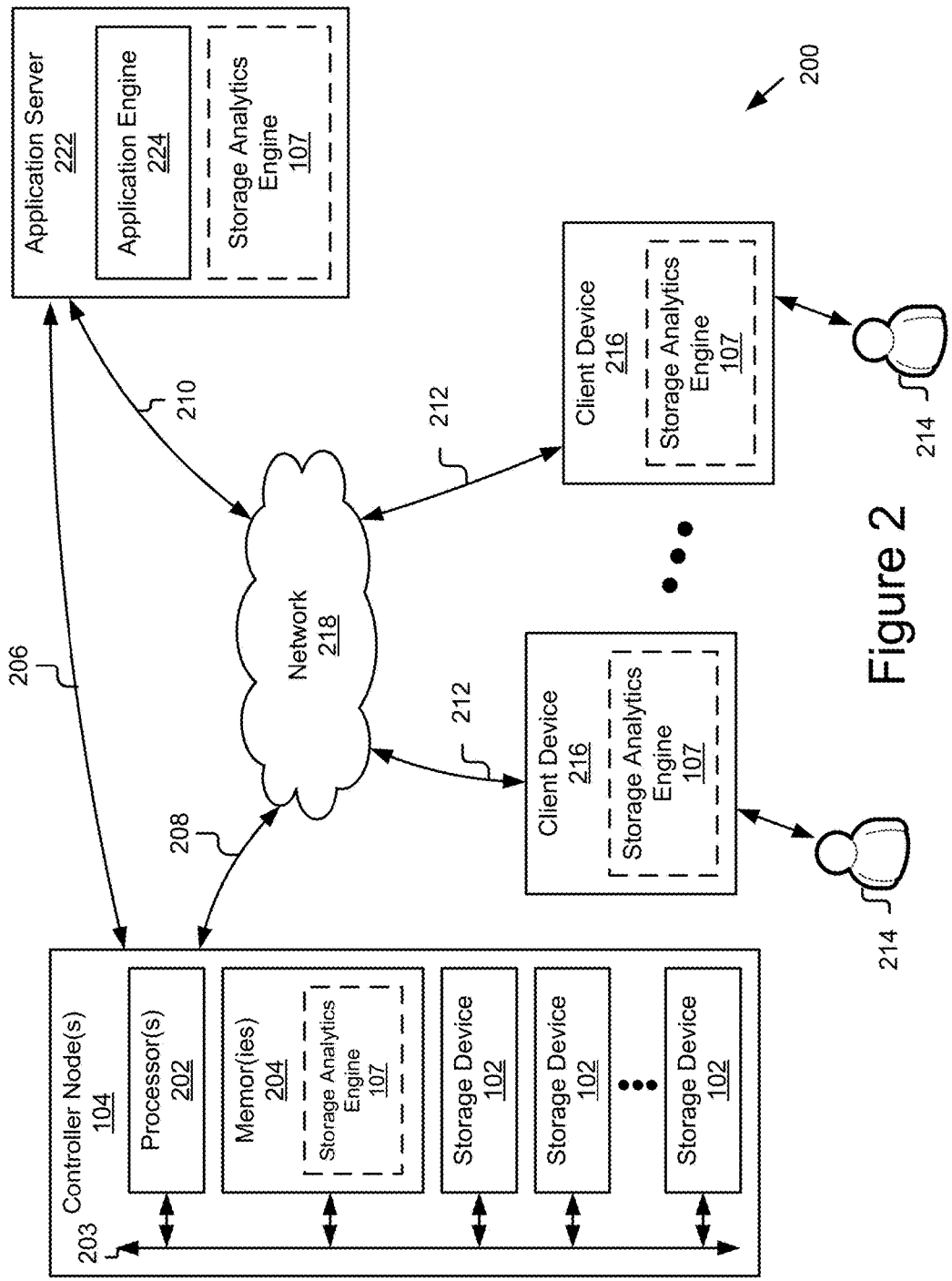
FIG. 2 is a block diagram of an example computing system for anomaly detection.

FIG. 2 is a block diagram of an example computing system 200 for anomaly detection. As shown, the system 200 may include one or more client devices 216, one or more controller node(s) 104 coupled to one or more storage device(s) 102, and an application server 222. The network 218 may couple the client device(s) 216, the controller node(s) 104, the storage device(s) 102, and the application server 222 for electronic communication with one another. For instance, the client devices 216, and their components, may be coupled to the network 218 via signal lines 212. The application server 222 and its components may be coupled to the network 218 via signal line 210. The application server 222 may additionally or alternatively be directly coupled to the controller node(s) 104 (e.g., via a standard wired data communications interface 206). The user(s) 214 may access one or more of the devices of the system 200, such as the client device(s) 216.

It should be understood that FIG. 2 is illustrative and other suitable system configurations are also possible and contemplated. For example, the system 200 could include any number of controller nodes 104, storage devices 102, client devices 216, third-party servers (not shown), application servers 222, and other systems and devices. Further, various components of the system 200 may be combined or further divided.

The network 218 may include any number of wired and/or wireless networks and/or network types. For example, the network 218 may include, but is not limited to, one or more local area networks (LANs), wide area networks (WANs) (e.g., the Internet), virtual private networks (VPNs), wireless wide area network (WWANs), WiMAX® networks, personal area networks (PANs) (e.g., Bluetooth® communication networks), various combinations thereof, etc. These private and/or public networks may have any number of configurations and/or topologies, and data may be transmitted via the networks using a variety of different communication protocols including, for example, various Internet layer, transport layer, or application layer protocols. For example, data may be transmitted via the networks using transmission control protocol (TCP)/internet protocol (IP), user datagram protocol (UDP), TCP, hypertext transfer protocol (HTTP), secure HTTP (HTTPS), dynamic adaptive streaming over HTTP (DASH), real time streaming protocol (RTSP), real time transport protocol (RTP), RTP control protocol (RTCP), voice over IP (VOIP), file transfer protocol (FTP), WebSocket protocol (WS), wireless application protocol (WAP), short message service (SMS), multimedia messaging service (MMS), XML messaging services (XMS), Internet message access protocol (IMAP), simple mail transfer protocol (SMTP), post office protocol (POP), web distributed authoring and versioning (WebDAV), or other known protocols.

In some embodiments, the system 200 may include a software communication mechanism implemented via the network 218 that can include and/or facilitate, for example, inter-method communication, local function or procedure calls, remote procedure calls, an object broker (e.g., common object request broker architecture (CORBA)), direct socket communication (e.g., TCP/IP sockets) among software modules, UDP broadcasts and receipts, HTTP connections, etc. Further, any or all of the communication could be secure (e.g., secure shell (SSH), HTTPS, etc.).

The client device 216 includes one or more computing devices having data processing and communication capabilities. The client device 216 may couple to and communicate with other client devices 216 and the other entities of the system 200 via the network 218 using a wireless and/or wired connection. Examples of client devices 216 may include, but are not limited to, mobile phones, tablets, laptops, desktops, netbooks, server appliances, servers, virtual machines, televisions (TVs), etc. The system 200 may include any number of client devices 216, including client devices of the same or different type.

The client devices 216 may store and/or operate software such as client-side instances of the storage analytics engine 107, an internet browser configured to send data requests to a web server, an operating system, other native or web-based applications, etc., that are configured to interact with the application server 222 via the network 218. An instance of the storage analytics engine 107 may comprise instructions executable by a processor of a client device 216 to present analytics data generated by the instance of the storage analytics engine 107 hosted on the application server 222. For instance, the instance of the storage analytics engine 107 operable on the client device 216 may be configured to display graphical user interfaces including data visualizations and other statistical data describing the performance of the storage devices 102 and/or other system 200 components, as discussed further elsewhere herein.

The controller node(s) 104 may include processor(s) 202, memor(ies) 204, and other electronics such as wired or wireless network interfaces, input and output devices, etc. The components of the controller node(s) may be coupled for electronic communication by a data bus 203. The data bus 203 may include any standard internal and/or external computer buses, such as various different types of parallel and/or serial buses. The data bus 203 may couple the controller node(s) 104 to one or more storage devices 102. In some embodiments, the data bus 203 or portion thereof may be integrated with network 218 and the controller node(s) 104, and the application server 222 may send data to and receive data from the storage device(s) 102 via the network 218. Other suitable variations are also possible and contemplated.

The processor(s) 202 may execute software instructions by performing various input, logical, and/or mathematical operations. The processor(s) 202 may have various computing architectures including, for example, a complex instruction set computer (CISC) architecture, a reduced instruction set computer (RISC) architecture, and/or an architecture implementing a combination of instruction sets. The processor(s) 202, which may include one or more processors, may be physical and/or virtual, and may include a single core or plurality of processing units and/or cores.

In some embodiments, the processor(s) 202 may be capable of generating and providing electronic display signals to a display device, supporting the display of images, capturing and transmitting images, performing complex tasks including various types of feature extraction and sampling, etc. In some embodiments, the processor(s) 202 may be coupled to the memor(ies) 204 via the bus 203 to access data and instructions therefrom and store data therein. The bus 203 may couple the processor(s) 202 to the other components of the computing system 200 including, for example, the memor(ies) 204, the storage device(s) 102, etc.

The memor(ies) 204 may store and provide access to data to the other components of the controller node(s) 104. The memor(ies) 204 may be included in a single computing device or a plurality of computing devices. In some embodiments, the memor(ies) 204 may store instructions and/or data that may be executed by the processor(s) 202. For example, the memor(ies) 204 may store an instance of the storage analytics engine 107, such as one comprising the monitor 105 and/or other elements. The memor(ies) 204 are also capable of storing other instructions and data, including, for example, an operating system, hardware drivers, other software applications, databases, etc. The memor(ies) 204 may be coupled to the bus 203 for communication with the processor(s) 202 and the other components of controller node 104.

The memor(ies) 204 may include a non-transitory computer-usable (e.g., readable, writeable, etc.) medium, which can be any non-transitory apparatus or device that can contain, store, communicate, propagate, or transport instructions, data, computer programs, software, code, routines, etc., for processing by or in connection with the processor(s) 202. In some embodiments, the memor(ies) 204 may include one or more of volatile memory and non-volatile memory (e.g., RAM, ROM, flash, etc.). It should be understood that the memor(ies) 204 may be a single device or may include multiple types of devices and configurations.

Figure 3:
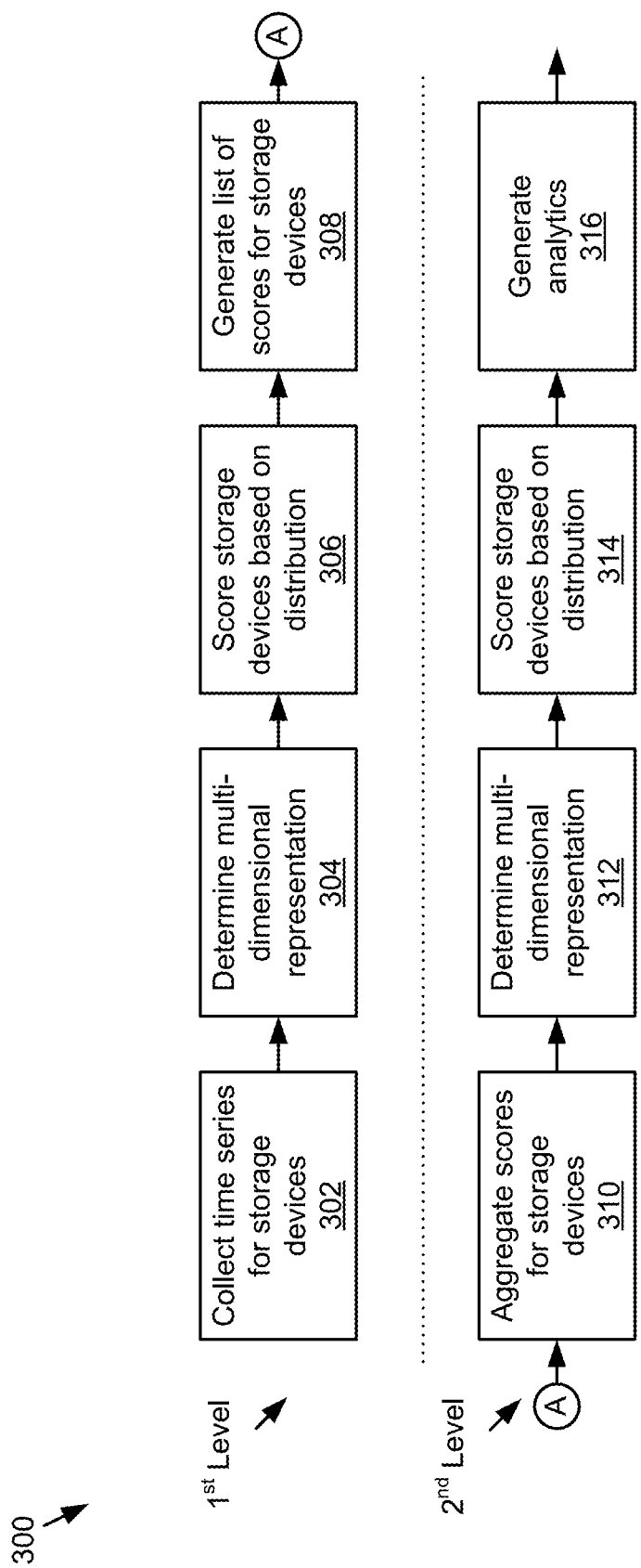
FIG. 3 is a flowchart of an example multi-level method for detecting storage device anomalies.

FIG. 3 is a flowchart of an example multi-level method for detecting storage device anomalies. In the depicted embodiment, the method 300 includes two levels of hierarchy, although it should be understood that additional levels of analysis may be included.

In block 302, the data collector 106 collects signal data including time series for a plurality of storage devices 102. In some embodiments, the signal data may be received from monitors 105 monitoring the signal data being produced by the components of the storage devices 102, controller nodes 104, and/or other aspects of the system 200. In some embodiments, the signal data may be retrieved from another information source, such as a server, data storage (e.g., the storage history data store 108), or another computer device.

As a further example, given a set of N storage devices in a storage enclosure, the data collector 106 collects K time series (e.g., associated with usage metrics or statistics) at regular intervals (e.g., every 15 minutes) for a given duration (e.g., 1 week). For instance, the collected data may comprise the information included in the following Table 1.

TABLE 1

| stat_name | device_name | ts | stat_value |
|---|---|---|---|
| write_bytes_processed | /dev/sg0 | 1.4507E+12 | 20762624 |
| write_bytes_processed | /dev/sg0 | 1.4507E+12 | 9940992 |
| write_bytes_processed | /dev/sg0 | 1.4507E+12 | 9957376 |
| write_bytes_processed | /dev/sg0 | 1.45071E+12 | 10018816 |
| write_bytes_processed | /dev/sg0 | 1.45071E+12 | 10014720 |
| write_bytes_processed | /dev/sg0 | 1.45071E+12 | 9785344 |
| ... | ... | ... | ... |
| write_bytes_processed | /dev/sgN | 1.4507E+12 | 20750336 |
| write_bytes_processed | /dev/sgN | 1.4507E+12 | 9895936 |
| write_bytes_processed | /dev/sgN | 1.4507E+12 | 9916416 |
| write_bytes_processed | /dev/sgN | 1.45071E+12 | 10211328 |
| write_bytes_processed | /dev/sgN | 1.45071E+12 | 10170368 |
| write_bytes_processed | /dev/sgN | 1.45071E+12 | 10207232 |
| read_bytes_processed | /dev/sg0 | 1.4507E+12 | 216866816 |
| read_bytes_processed | /dev/sg0 | 1.4507E+12 | 2785280 |
| read_bytes_processed | /dev/sg0 | 1.4507E+12 | 1990656 |
| read_bytes_processed | /dev/sg0 | 1.45071E+12 | 1990656 |
| read_bytes_processed | /dev/sg0 | 1.45071E+12 | 2121728 |
| read_bytes_processed | /dev/sg0 | 1.45071E+12 | 2654208 |
| ... | ... | ... | ... |
| read_bytes_processed | /dev/sgN | 1.4507E+12 | 256745472 |
| read_bytes_processed | /dev/sgN | 1.4507E+12 | 2654208 |
| read_bytes_processed | /dev/sgN | 1.4507E+12 | 1990656 |
| read_bytes_processed | /dev/sgN | 1.45071E+12 | 1990656 |
| read_bytes_processed | /dev/sgN | 1.45071E+12 | 1990656 |
| read_bytes_processed | /dev/sgN | 1.45071E+12 | 2654208 |
| num_read_commands | /dev/sg0 | 1.4507E+12 | 2034 |
| num_read_commands | /dev/sg0 | 1.4507E+12 | 237 |
| num_read_commands | /dev/sg0 | 1.4507E+12 | 177 |
| num_read_commands | /dev/sg0 | 1.45071E+12 | 177 |
| num_read_commands | /dev/sg0 | 1.45071E+12 | 177 |
| num_read_commands | /dev/sg0 | 1.45071E+12 | 236 |
| ... | ... | ... | ... |

TABLE 1-continued

| stat_name | device_name | ts | stat_value |
|---|---|---|---|
| num_read_commands | /dev/sgN | 1.4507E+12 | 2346 |
| num_read_commands | /dev/sgN | 1.4507E+12 | 237 |
| num_read_commands | /dev/sgN | 1.4507E+12 | 177 |
| num_read_commands | /dev/sgN | 1.45071E+12 | 177 |
| num_read_commands | /dev/sgN | 1.45071E+12 | 177 |
| num_read_commands | /dev/sgN | 1.45071E+12 | 236 |
| num_write_commands | /dev/sg0 | 1.4507E+12 | 1708 |
| num_write_commands | /dev/sg0 | 1.4507E+12 | 870 |
| num_write_commands | /dev/sg0 | 1.4507E+12 | 872 |
| num_write_commands | /dev/sg0 | 1.45071E+12 | 883 |
| num_write_commands | /dev/sg0 | 1.45071E+12 | 882 |
| num_write_commands | /dev/sg0 | 1.45071E+12 | 825 |
| . . . | . . . | . . . | . . . |
| num_write_commands | /dev/sgN | 1.4507E+12 | 1880 |
| num_write_commands | /dev/sgN | 1.4507E+12 | 847 |
| num_write_commands | /dev/sgN | 1.4507E+12 | 857 |
| num_write_commands | /dev/sgN | 1.45071E+12 | 931 |
| num_write_commands | /dev/sgN | 1.45071E+12 | 924 |
| num_write_commands | /dev/sgN | 1.45071E+12 | 922 |
| avegFile_read | /dev/sg0 | 1.4507E+12 | 106620.8535 |
| avegFile_read | /dev/sg0 | 1.4507E+12 | 11752.23629 |
| avegFile_read | /dev/sg0 | 1.4507E+12 | 11246.64407 |
| avegFile_read | /dev/sg0 | 1.45071E+12 | 11246.64407 |
| avegFile_read | /dev/sg0 | 1.45071E+12 | 11987.16384 |
| avegFile_read | /dev/sg0 | 1.45071E+12 | 11246.64407 |
| . . . | . . . | . . . | . . . |
| avegFile_read | /dev/sgN | 1.4507E+12 | 109439.6726 |
| avegFile_read | /dev/sgN | 1.4507E+12 | 11199.18987 |
| avegFile_read | /dev/sgN | 1.4507E+12 | 11246.64407 |
| avegFile_read | /dev/sgN | 1.45071E+12 | 11246.64407 |
| avegFile_read | /dev/sgN | 1.45071E+12 | 11246.64407 |
| avegFile_read | /dev/sgN | 1.45071E+12 | 11246.64407 |
| avegFile_write | /dev/sg0 | 1.4507E+12 | 12156.10304 |
| avegFile_write | /dev/sg0 | 1.4507E+12 | 11426.42759 |
| avegFile_write | /dev/sg0 | 1.4507E+12 | 11419.00917 |
| avegFile_write | /dev/sg0 | 1.45071E+12 | 11346.33749 |
| avegFile_write | /dev/sg0 | 1.45071E+12 | 11354.55782 |
| avegFile_write | /dev/sg0 | 1.45071E+12 | 11861.02303 |
| . . . | . . . | . . . | . . . |
| avegFile_write | /dev/sgN | 1.4507E+12 | 11037.41277 |
| avegFile_write | /dev/sgN | 1.4507E+12 | 11683.51358 |
| avegFile_write | /dev/sgN | 1.4507E+12 | 11571.08051 |
| avegFile_write | /dev/sgN | 1.45071E+12 | 10968.12889 |
| avegFile_write | /dev/sgN | 1.45071E+12 | 11006.89177 |
| avegFile_write | /dev/sgN | 1.45071E+12 | 11070.75054 |

In this example, there are N number (e.g., 98) of storage devices 102. Given the volume of data, for brevity and so as not to unnecessarily lengthen the disclosure, the data in Table 1 is abbreviated to show the data for only a portion of those storage devices 102. However, it should be clear that similar data for the other storage devices 102 would also be present.

In Table 1, the stat_name column contains the statistic name. The device_name column contains a unique identifier for a storage device 102 (e.g., drive in a storage enclosure). The ts column contains the time stamp for each entry. The stat_value column contains the actual statistic value in the time series. In this specific example, there are 6 different statistics and N storage devices 102.

In block 304, the $1^{st}$ level analyzer 110 determines a hyper feature representation from the signal data collected in block 302. The hyper feature representation may be embodied by a multi-dimensional matrix in some embodiments. For instance, the $1^{st}$ level analyzer 110 may combine the statistical values associated with each time series sample into a hyper feature representation. In some embodiments, the hyper feature representation is optimized to preserve a maximal amount of information (in terms of variance), although numerous other variations are contemplated, such as representations that are configured to optimize processing time, memory use, or other objectives. In some embodiments, the $1^{st}$ level analyzer 110 may include a statistical transformation algorithm to analyze the collected signal data and generate the hyper feature representation. For example, the $1^{st}$ level analyzer 110 may analyze the collected signal data using Principal Component Analysis (PCA).

Continuing the non-limiting example introduced in reference to block 302, the $1^{st}$ level analyzer 110 may analyze the K statistical time series independently (statistic-by-statistic) for each of the N storage devices 102. In comparison with other solutions, such as those discussed in the Background that extract time series features, the $1^{st}$ level analyzer 110 may preserve the time series representation to identify regions of interest in the time domain. The $1^{st}$ level analyzer 110 may use PCA to reduce the time series space to a certain multi-dimensional space (e.g., two-dimensional (2D)). For instance, the $1^{st}$ level analyzer 110 analyzes the (e.g., 2) principal components in the time domain using standard outlier detection techniques to identify regions of interest.

In block 306, the $1^{st}$ level analyzer 110 may use the hyper feature representation to compute a score for each statistic of each storage device 102. In some embodiments, the $1^{st}$ level analyzer 110 may analyze the signal data associated each of the K statistics for each of the N storage devices 102 included in the hyper feature representation and calculate a statistical score for each storage device 102 on a statistic-by-statistic basis based on the analysis. The score may indicate, for each statistic, which storage devices 102 are anomalous.

For instance, to make the statistical scoring comparable among different statistics, the $1^{st}$ level analyzer 110 may fit a multivariate (e.g., 2-variate) t distribution. The $1^{st}$ level analyzer 110 may use the statistical score loadings in the multi-dimensional PCA-based space for the fitting. The $1^{st}$ level analyzer 110 may score each of the K statistics for each of the N storage devices using the estimated t probability density function.

In some embodiments, when computing the statistical scores, the $1^{st}$ level analyzer 110 may determine the difference between the time series of the storage devices 102 and a steady state (e.g., mean series) using the hyper feature representation (e.g., a 2-D matrix, plot, etc.). The times series represented by the (e.g., 2) principal components may be combined (e.g., linearly, etc.) based on the statistical scores in the multi-dimensional (e.g., 2-D) space. The $1^{st}$ level analyzer 110 may use standard outlier detection techniques for each point of the time series and may select a top portion (e.g., top 10%, 15%, 25%, etc.) of the outliers based on an absolute t-statistic value.

A statistical score for a storage device 102 may reflect one or more features. In some embodiments, a statistical score may comprise a feature vector of dimension K. As a further example, scores for the outliers detected by the $1^{st}$ level analyzer 110 may include corresponding minimum and maximum time stamps.

In cases where the steady state may creep in one direction or another over time, the $1^{st}$ level analyzer 110 can adapt when generating a score. For instance, the $1^{st}$ level analyzer 110 can map the steady state of a given statistic to a single random variable and perform hierarchical clustering on values of this variable to determine if the cluster containing highest value is small and statistically significant in comparison to the rest of the points.

In some embodiments, the $1^{st}$ level analyzer 110 may update the hyper feature representation to include the scores.

In block 308, the $1^{st}$ level analyzer 110 generates a list of statistical scores associated with each storage device 102. The $1^{st}$ level analyzer 110 may use the scores and the hyper feature representation to generate the list.

By way of further illustration, based on the data provided in Table 1, the result of the analysis performed by the $1^{st}$ level analyzer 110 is depicted in the following Table 2.

TABLE 2

| stat_name | device_name | Rank | RankScores | Scores2D_PC1 | Scores2D_PC2 | roi.ts0 | roi.ts1 |
|---|---|---|---|---|---|---|---|
| write_bytes_processed | /dev/sg72 | 1 | −53.349 | 2.61E+08 | 5.21E+08 | 0 | 0 |
| ... | ... | ... | ... | ... | ... | ... | ... |
| write_bytes_processed | /dev/sgN | 43 | −38.1163 | 57565401 | 40801804 | 0 | 0 |
| ... | ... | ... | ... | ... | ... | ... | ... |
| write_bytes_processed | /dev/sg0 | 95 | −37.8081 | −3.4E+07 | −4E+07 | 0 | 0 |
| ... | ... | ... | ... | ... | ... | ... | ... |
| write_bytes_processed | /dev/sg47 | N | −37.7855 | −3.1E+07 | −3.9E+07 | 0 | 0 |
| read_bytes_processed | /dev/sg61 | 1 | −48.1616 | 3.08E+08 | −6.3E+08 | 0 | 0 |
| ... | ... | ... | ... | ... | ... | ... | ... |
| read_bytes_processed | /dev/sgN | 48 | −41.2067 | −1.5E+08 | 1.03E+09 | 0 | 0 |
| ... | ... | ... | ... | ... | ... | ... | ... |
| read_bytes_processed | /dev/sg0 | N | −40.6326 | 58228029 | −6E+08 | 0 | 0 |
| num_read_commands | /dev/sg73 | 1 | −32.5911 | −6151.75 | −16611.8 | 0 | 0 |
| ... | ... | ... | ... | ... | ... | ... | ... |
| num_read_commands | /dev/sgN | 50 | −18.111 | −1144.96 | −2525.29 | 0 | 0 |
| ... | ... | ... | ... | ... | ... | ... | ... |
| num_read_commands | /dev/sg0 | 96 | −17.658 | 895.756 | 5492.65 | 0 | 0 |
| ... | ... | ... | ... | ... | ... | ... | ... |
| num_read_commands | /dev/sg47 | N | −17.6543 | 772.59 | 5725.191 | 0 | 0 |
| num_write_commands | /dev/sg73 | 1 | −40.2906 | −21926.4 | −175686 | 0 | 0 |
| ... | ... | ... | ... | ... | ... | ... | ... |
| num_write_commands | /dev/sgN | 35 | −20.8968 | 4501.954 | 948.06 | 0 | 0 |
| ... | ... | ... | ... | ... | ... | ... | ... |
| num_write_commands | /dev/sg0 | 95 | −20.7199 | −2516.39 | 6151.188 | 0 | 0 |
| ... | ... | ... | ... | ... | ... | ... | ... |
| num_write_commands | /dev/sg35 | N | −20.6843 | −2204.77 | 6356.732 | 0 | 0 |
| avegFile_read | /dev/sgN | 1 | −51.1174 | −2220441 | −3312830 | 0 | 0 |
| ... | ... | ... | ... | ... | ... | ... | ... |
| avegFile_read | /dev/sg0 | 52 | −26.0695 | 107463.4 | 109654.4 | 0 | 0 |
| ... | ... | ... | ... | ... | ... | ... | ... |
| avegFile_read | /dev/sg73 | N | −25.8633 | −31890.3 | −41138.8 | 0 | 0 |
| avegFile_write | /dev/sg72 | 1 | −28.6762 | −66879.8 | −28907.9 | 0 | 0 |
| ... | ... | ... | ... | ... | ... | ... | ... |
| avegFile_write | /dev/sg0 | 40 | −22.6422 | 25135.22 | −20842.3 | 0 | 0 |
| ... | ... | ... | ... | ... | ... | ... | ... |
| avegFile_write | /dev/sgN | 90 | −21.9674 | −7887.65 | 12645.23 | 0 | 0 |
| ... | ... | ... | ... | ... | ... | ... | ... |
| avegFile_write | /dev/sg37 | N | −21.8273 | −2293.86 | −5848.63 | 0 | 0 |

In some embodiments, for storage purposes, the results for each statistic may be layered together (e.g., on top of each other) in the list. However, the analysis for each statistic may be independent. In Table 2, the stat_name column contains the statistic name; the device_name column is a unique identifier for the storage device 102; the Rank column contains the storage device 102 ranking order (e.g., highest having the greatest deviation from average, steady state, etc.); the RankScores column contains the storage device 102 scores; the Scores2D_PC1 column contains the first principal component value for the storage device 102 (e.g., x-axis value in FIG. 4); the Scores2D_PC2 column contains the second principal component value for the storage device 102 (e.g., y-axis value in FIG. 4); and the roi.ts0 and roi.ts1 columns are the timestamps of the time window of interest for each storage device 102.

In the $2^{nd}$ level analysis, the $2^{nd}$ level analyzer 112 uses the set of scores determined for each storage device and statistic in block 308 to determine anomalous storage devices. In block 310, the $2^{nd}$ level analyzer 112 may aggregate the scores for the storage devices (also called feature or score extraction). In some embodiments, aggregating the scores may including retrieving the list from data storage (e.g., memory, data node, table, etc.). The $2^{nd}$ level analyzer 112 may aggregate the scores from the list of scores generated in block 308 of the $1^{st}$ level analysis. In some embodiments, the list of scores may be vector-based, such as a feature matrix (of dimension N times K). The list of scores may include one or more scores for each storage device 102.

In block 312, the $2^{nd}$ level analyzer 112 may determine a reduced hyper feature representation (e.g., 2-D representation) that aggregates the statistical scores for each storage device 102. In some embodiments, during determination, the $2^{nd}$ level analyzer 112 uses PCA to reduce the score feature space to a 2 dimensional space embodied by the reduced hyper feature representation. As a non-limiting example, the $1^{st}$ and $2^{nd}$ level analyzers 110 and 112 may implement the PCA algorithm using the R package pcaPP, although other suitable implementation schemes are also applicable and contemplated.

In block 314, the $2^{nd}$ level analyzer 112 may use the hyper feature representation determined in block 312 to generate a storage device score for each of the storage devices 102. In some embodiments, the $2^{nd}$ level analyzer 112 may evaluate the scores of the K statistics associated with a particular storage device included in the hyper feature representation to generate the score for that storage device 102. The storage device score may quantify the operational performance of that storage device 102 and used to determine if the performance is anomalous (e.g., imbalanced, etc.). The $2^{nd}$ level analyzer 112 may update the hyper feature representation to include the computed storage device 102 scores and/or data associated therewith, such as rankings, weighted list of statistics, etc.

In some embodiments, to generate the score, similar to the $1^{st}$ level analysis, the $2^{nd}$ level analyzer 112 may fit a multivariate t distribution using the statistic-per-storage device scores in the reduced hyper feature representation (e.g., the 2-D PCA-based space) for this fitting. The $2^{nd}$ level analyzer 112 may score each storage device 102 using the estimated t probability density function. As a non-limiting example, the $1^{st}$ and $2^{nd}$ level analyzers 110 and 112 may implement the time series outlier detection algorithm using the R package tsoutliers, although other suitable implementation schemes are also applicable and contemplated. The hyper outlier detection framework in block 314 can advantageously aggregate the lower level score combinations based on how unusual the scores are.

In some embodiments, the $2^{nd}$ level analyzer 112 ranks the statistics of each storage device 102 by finding a linear combination of statistical weights for each of the (e.g., 2) principal components (also called loadings) of the $2^{nd}$ level analysis. The $2^{nd}$ level analyzer may perform this ranking by 1) determining a storage device 102 score vector difference between the statistical scores for that storage device 102 and mean statistical scores determined from the distribution of scores in the hyper feature representation; and 2) ordering the statistics based on an absolute statistical score determined using the score vector determined in (1). The statistical score vector may be represented by the principal components (e.g. 2 principal components), which may be combined (e.g., linearly) based on storage device 102 scores in the multidimensional (e.g., 2-D) space. Example storage device scores are depicted in the scatter plot illustrated in FIG. 6 and discussed in further detail below.

By way of further illustration, based on the analysis results provided in Table 2, the result of the analysis including overall storage device ranking results determined by the $2^{nd}$ level analyzer 112 is depicted in the following Table 3.

TABLE 3

| device_name | Rank | RankScores | Scores2D_PC1 | Scores2D_PC2 | RankStat.1 | RankStat.2 |
|---|---|---|---|---|---|---|
| /dev/sg73 | 1 | −24.6008407 | −19.07244219 | 7.450385573 | num_read_commands | read_bytes_processed |
| /dev/sgN | 2 | −19.38333913 | −9.23882616 | −10.25953092 | write_bytes_processed | avegFile_read |
| /dev/sg72 | 3 | −19.33576828 | −18.42159894 | 3.491468259 | num_read_commands | read_bytes_processed |
| /dev/sg93 | 4 | −18.41675898 | −10.00489838 | −9.531079309 | avegFile_read | write_bytes_processed |
| /dev/sg64 | 5 | −8.30289241 | −5.109623186 | −5.147436613 | avegFile_read | write_bytes_processed |
| /dev/sg61 | 6 | −5.964092296 | −1.219097361 | 4.016832566 | num_read_commands | num_write_commands |
| /dev/sg79 | 7 | −4.894731748 | −3.574254777 | −2.176477146 | avegFile_read | write_bytes_processed |
| /dev/sg74 | 8 | −4.237127486 | −0.758582417 | 1.969898343 | num_read_commands | num_write_commands |
| /dev/sg92 | 9 | −4.110292551 | −0.121381781 | 1.78889314 | avegFile_write | num_read_commands |
| /dev/sg10 | 10 | −4.086279983 | −0.326446393 | 1.72767701 | avegFile_write | num_read_commands |
| ... | ... | ... | ... | ... | ... | ... |
| /dev/sg47 | 22 | −3.810007292 | 1.751506078 | 0.045019863 | num_read_commands | num_write_commands |
| ... | ... | ... | ... | ... | ... | ... |
| /dev/sg35 | 27 | −3.793096519 | 1.562287022 | −0.284647528 | num_read_commands | read_bytes_processed |
| /dev/sg0 | 34 | −3.781415012 | 1.46214138 | −0.318357232 | num_read_commands | read_bytes_processed |
| ... | ... | ... | ... | ... | ... | ... |
| /dev/sg96 | 97 | −3.669313576 | 0.392032489 | 0.012195927 | num_read_commands | num_write_commands |
| /dev/sg94 | N | −3.668135771 | 0.356240853 | 0.035057337 | num_read_commands | avegFile_read |

| device_name | RankStat.3 | RankStat.4 | RankStat.5 | RankStat.6 |
|---|---|---|---|---|
| /dev/sg73 | num_write_commands | avegFile_write | avegFile_read | write_bytes_processed |
| /dev/sgN | avegFile_write | num_read_commands | num_write_commands | read_bytes_processed |
| /dev/sg72 | num_write_commands | avegFile_read | avegFile_write | write_bytes_processed |
| /dev/sg93 | avegFile_write | num_read_commands | num_write_commands | read_bytes_processed |
| /dev/sg64 | avegFile_write | num_read_commands | num_write_commands | read_bytes_processed |
| /dev/sg61 | avegFile_write | read_bytes_processed | avegFile_read | write_bytes_processed |
| /dev/sg79 | avegFile_write | num_read_commands | num_write_commands | read_bytes_processed |

TABLE 3-continued

| /dev/sg74 | read_bytes_processed | avegFile_write | avegFile_read | write_bytes_processed |
|---|---|---|---|---|
| /dev/sg92 | num_write_commands | avegFile_read | write_bytes_processed | read_bytes_processed |
| /dev/sg10 | num_write_commands | read_bytes_processed | avegFile_read | write_bytes_processed |
| ... | ... | ... | ... | ... |
| /dev/sg47 | avegFile_read | read_bytes_processed | write_bytes_processed | avegFile_write |
| ... | ... | ... | ... | ... |
| /dev/sg35 | num_write_commands | avegFile_read | avegFile_write | write_bytes_processed |
| /dev/sg0 | num_write_commands | avegFile_read | avegFile_write | write_bytes_processed |
| ... | ... | ... | ... | ... |
| /dev/sg96 | avegFile_read | read_bytes_processed | write_bytes_processed | avegFile_write |
| /dev/sg94 | write_bytes_processed | num_write_commands | read_bytes_processed | avegFile_write |

In Table 3, the device_name column contains the unique identifier for each storage device 102 (e.g., a hard disk identifier in a storage node); the Rank column contains the rank for each storage device 102 (the storage devices 102 in the first column are sorted from biggest outlier to smallest outlier); the RankScores column contains the storage device 102 score for each storage device 102 (which are used to determine the ranks for the storage devices 102); the Scores2D_PC1 column contains the first principal component value for each storage device 102; the Scores2D_PC2 column contains the second principal component value for each storage device 102; the RankStat.1, . . . , RankStat.6 columns includes the statistics ranked by weight for each storage device 102.

In block 316, the reporting engine 114 generates analytics describing the performance of the storage devices using the overall storage device scores. The reporting engine 114, using the ranked storage devices 102 in the hyper feature representation, may identify the top statistics for the storage devices 102 showing the most unusual patterns (e.g., the anomalous storage devices 102). The reporting engine 114 may detect regions of interest for the principal components of the statistics. For instance, the reporting engine 114 may weight the regions using the data included in the hyper feature representation for the anomalous storage devices 102 and narrow the corresponding time series of the statistics associated with those storage devices 102 to focused regions using the weights.

As a further example, the analytics can conveniently determine storage devices 102 exhibiting abnormal behavior. For instance, it may be desirable for the usage patterns across all storage devices in a given storage rack to be evenly distributed (with a certain amount of acceptable variability (e.g., 0-15%, etc.)). For example, when storing data objects, it is desirable in some cases to distribute the object store data evenly across all storage devices. However, various imbalances occur over time due to various factors. For instance, internal storage algorithms may not be collecting or balancing data correctly when dividing the data across the storage devices of the rack, or the storage devices may be experiencing mechanical failure or reduced performance causing a data or performance imbalance. The analytics are beneficial, since they can determine human-interpretable data predicting storage device 102 failures, performance bottlenecks, etc. Further, the analytics can limit false positive identification of anomalous storage devices by determining storage device 102 scores based on a plurality of statistical scores associated with each of the storage devices 102, which represent multiple different viewpoints of each storage device's 102 performance.

The analytics may include visualizations comparing the storage devices 102 based on their rankings, visualizations illustrating the statistics backing the storage device 102 scores (particularly the set of storage devices 102 demonstrating anomalous behavior), regions of interest associated with the principal components of the statistics, etc. These analytics can be used by a stakeholder to determine which storage devices may be failure-prone, what statistics support these findings, the degree to which the behavior is anomalous, whether the behavior is a spike or shift, etc.

Figure 4:
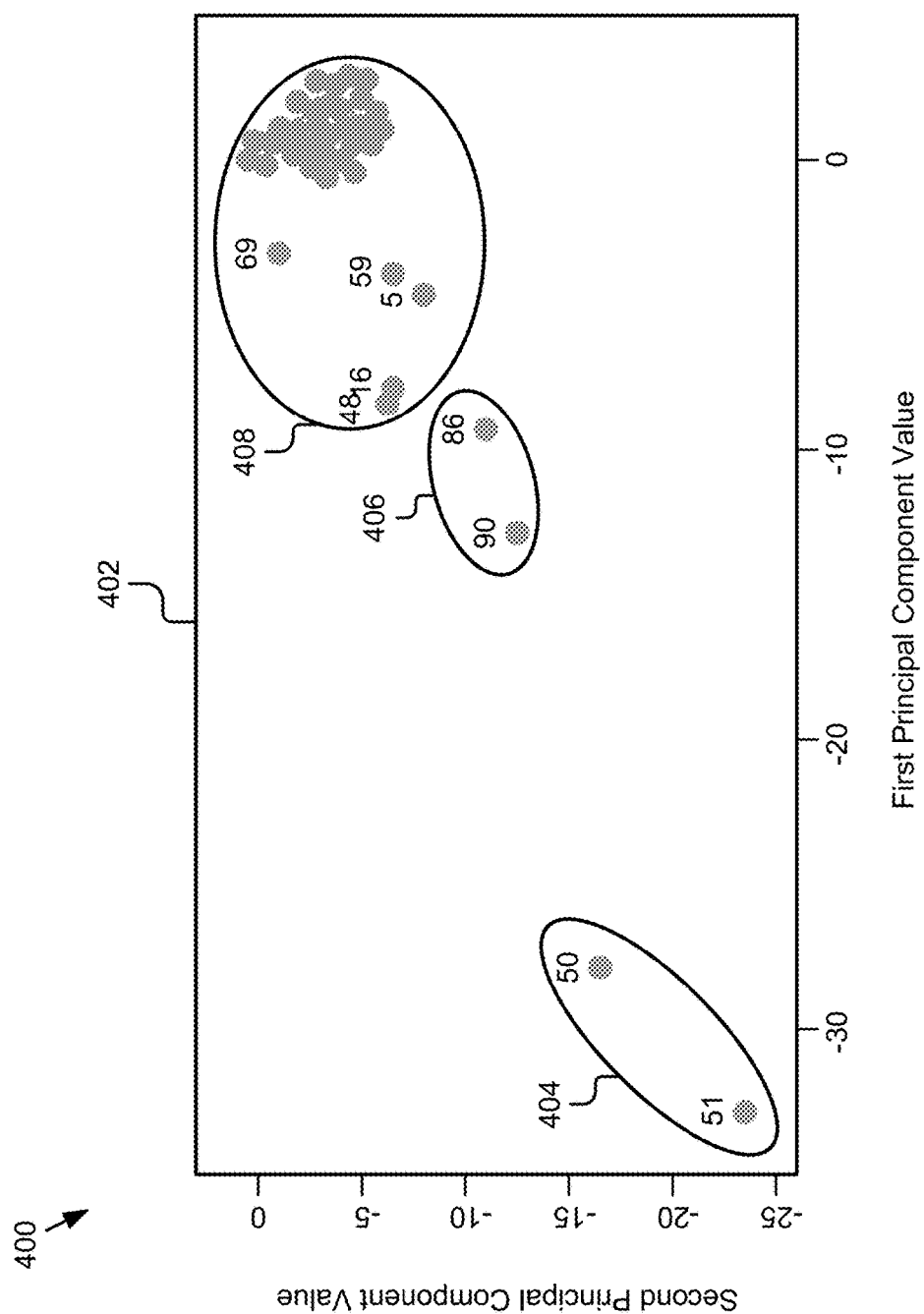
FIG. 4 is a scatter plot of example ranked storage devices.

FIG. 4 is a scatterplot 400 of example ranked storage devices produced by the reporting engine 114 based on the $2^{nd}$ level analysis. As shown, three different clusters are included in the scatter plot 400. Cluster 408 includes the majority of the storage devices, which are operating within normal parameters relative to an average and/or a mean. Clusters 406 and 404 include storage devices exceeding normal parameters relative to the other storage devices in the plot. FIGS. 5A-5D include specific example statistical time series illustrating the anomalous behavior of storage devices 50 and 51 in cluster 404 and storage devices 90 and 86 in cluster 406.

Figure 5A:
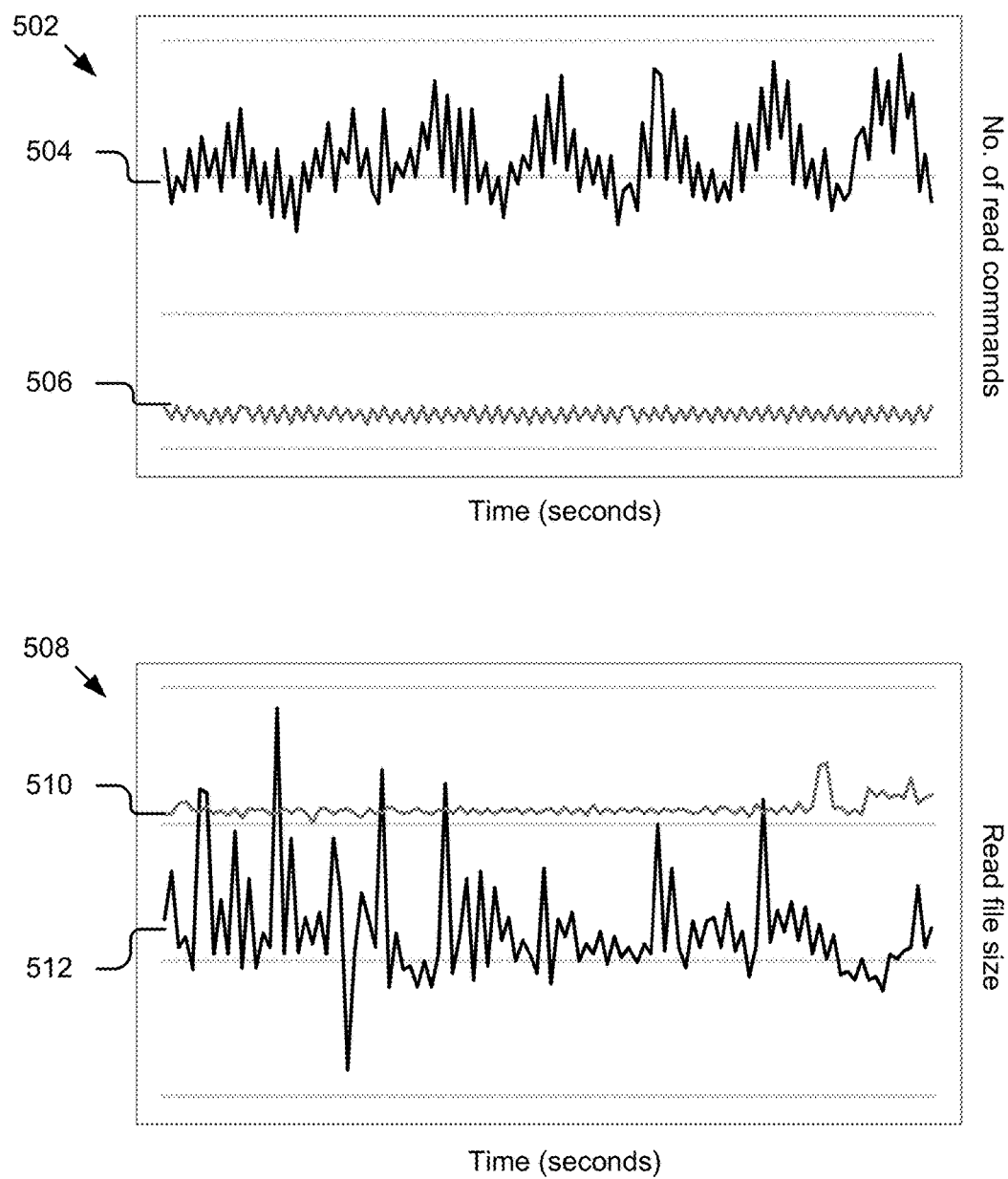
FIGS. 5A-5D include graphs illustrating example anomalous statistical time series associated with various different storage devices.

FIG. 5A includes two graphs 502 and 508 illustrating example time series of a first storage device relative to norms. In graph 502, storage device 51 is exhibiting a significantly larger number of read commands 504 relative to an average 506. In graph 508, storage device 51 is exhibiting significantly smaller read file sizes 512 (due to small file sizes) relative to an average 510.

Figure 5B:
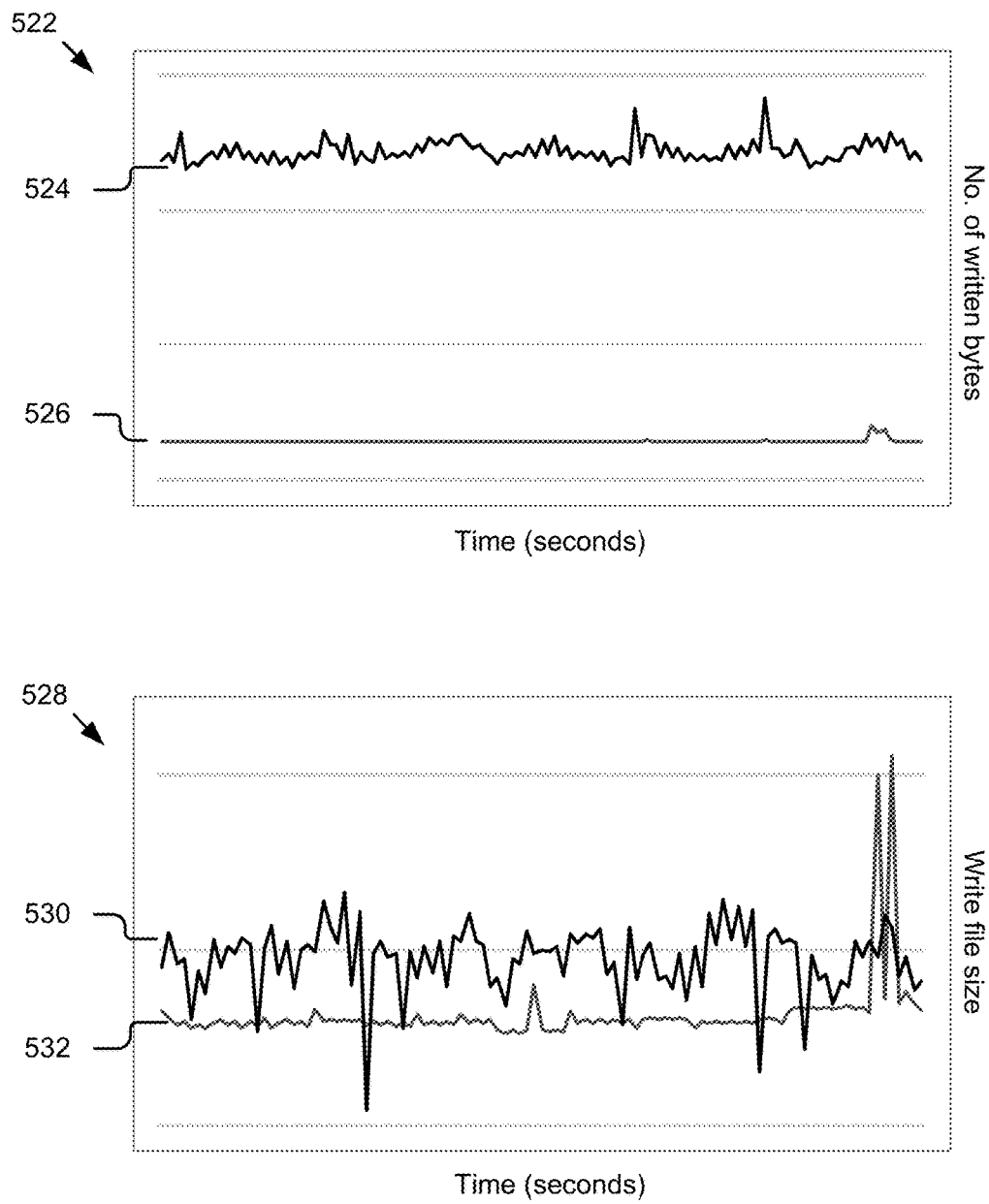

FIG. 5B includes two graphs 522 and 528 illustrating further example time series of a second storage device relative to norms. In graph 522, storage device 50 is exhibiting a significantly larger number of written bytes 524 relative to an average 526. In graph 528, storage device 50 is exhibiting significantly larger write file sizes 530 relative to an average 532.

Figure 5C:
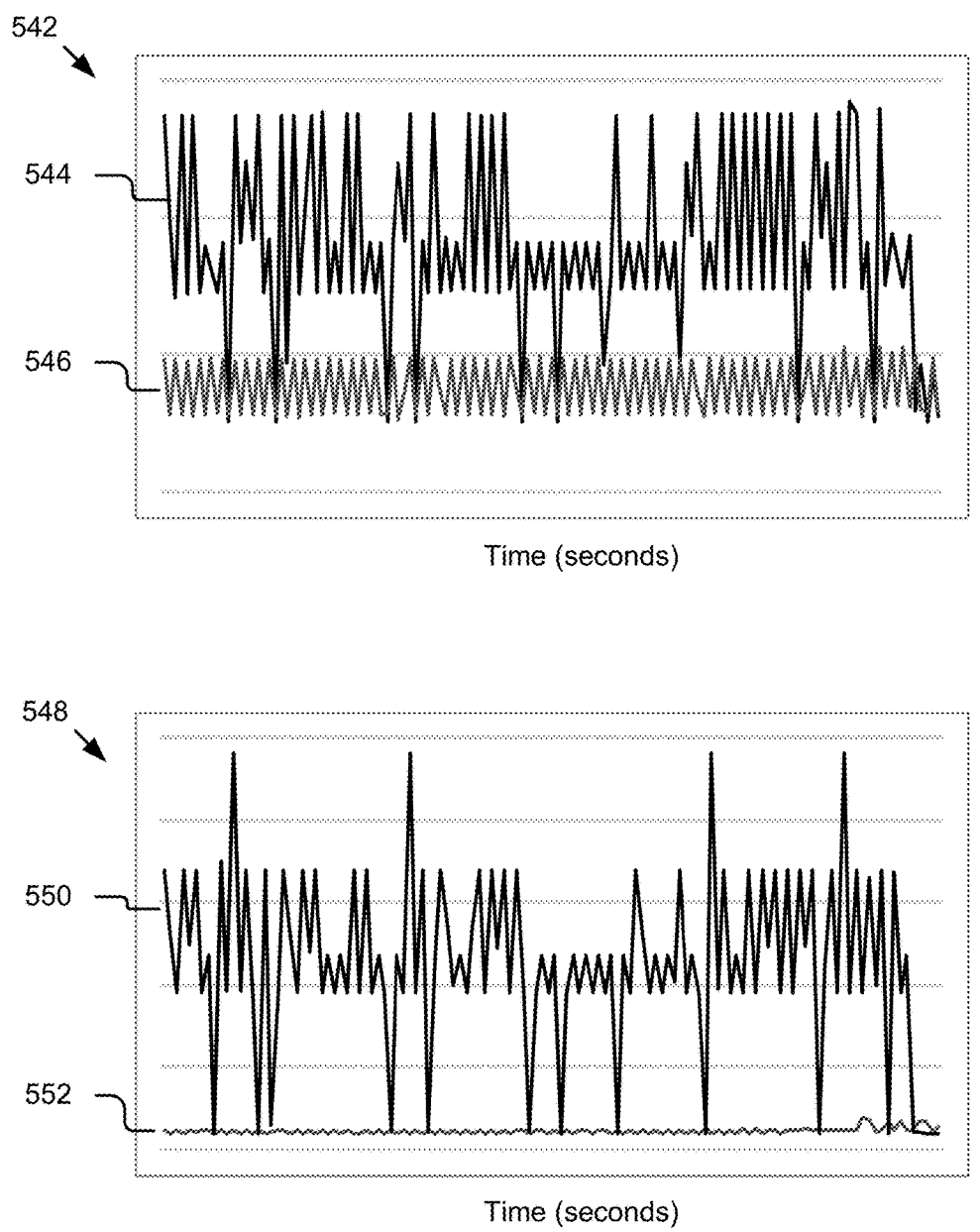

FIG. 5C includes two graphs 542 and 548 illustrating further example time series of a third storage device relative to norms. In graph 542, storage device 90 is exhibiting a significantly larger number of read bytes 544 relative to an average 546. In graph 548, storage device 90 is exhibiting significantly larger read file sizes 550 (due to large file sizes) relative to an average 552.

Figure 5D:
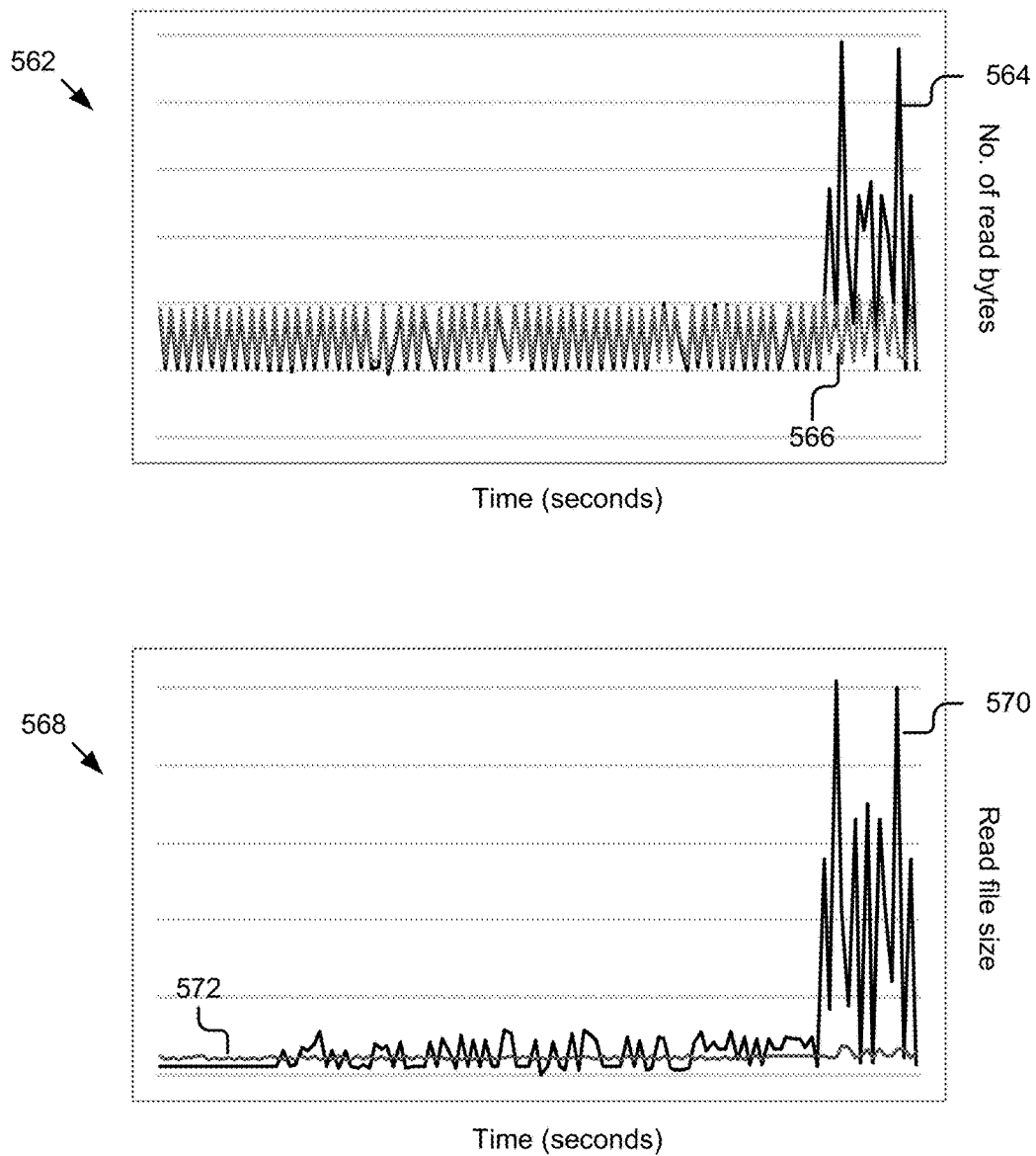

FIG. 5D includes two graphs 562 and 568 illustrating further example time series of a fourth storage device relative to norms. In graph 562, storage device 86 is exhibiting a significantly larger number of read bytes 564 relative to an average 566. In graph 568, storage device 86 is exhibiting significantly larger read file sizes 570 relative to an average 572.

Figure 6:
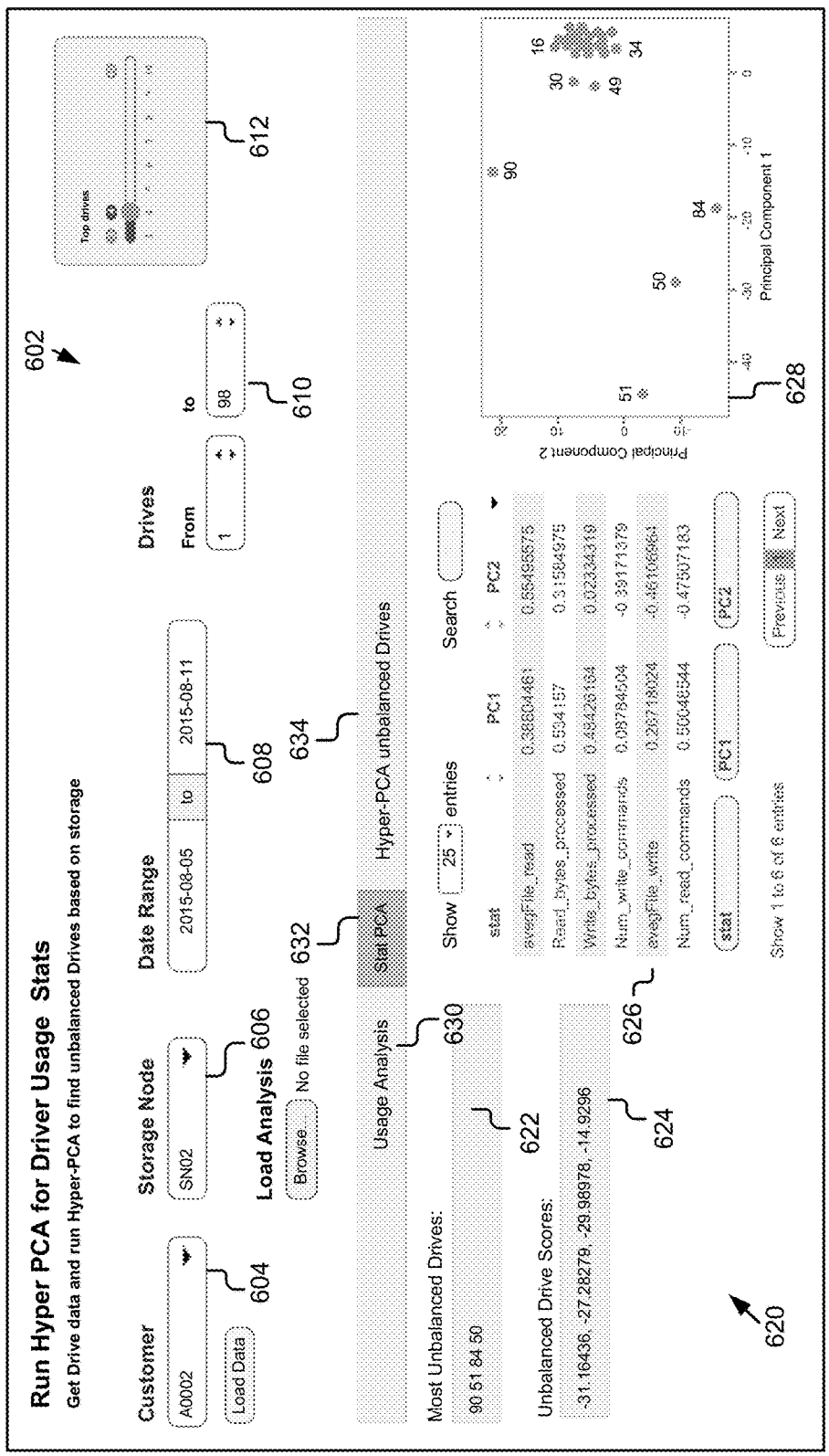
FIGS. 6, 7, and 8 are graphical representations of an example graphical user interface presenting anomalous storage device analytics.
Figure 7:
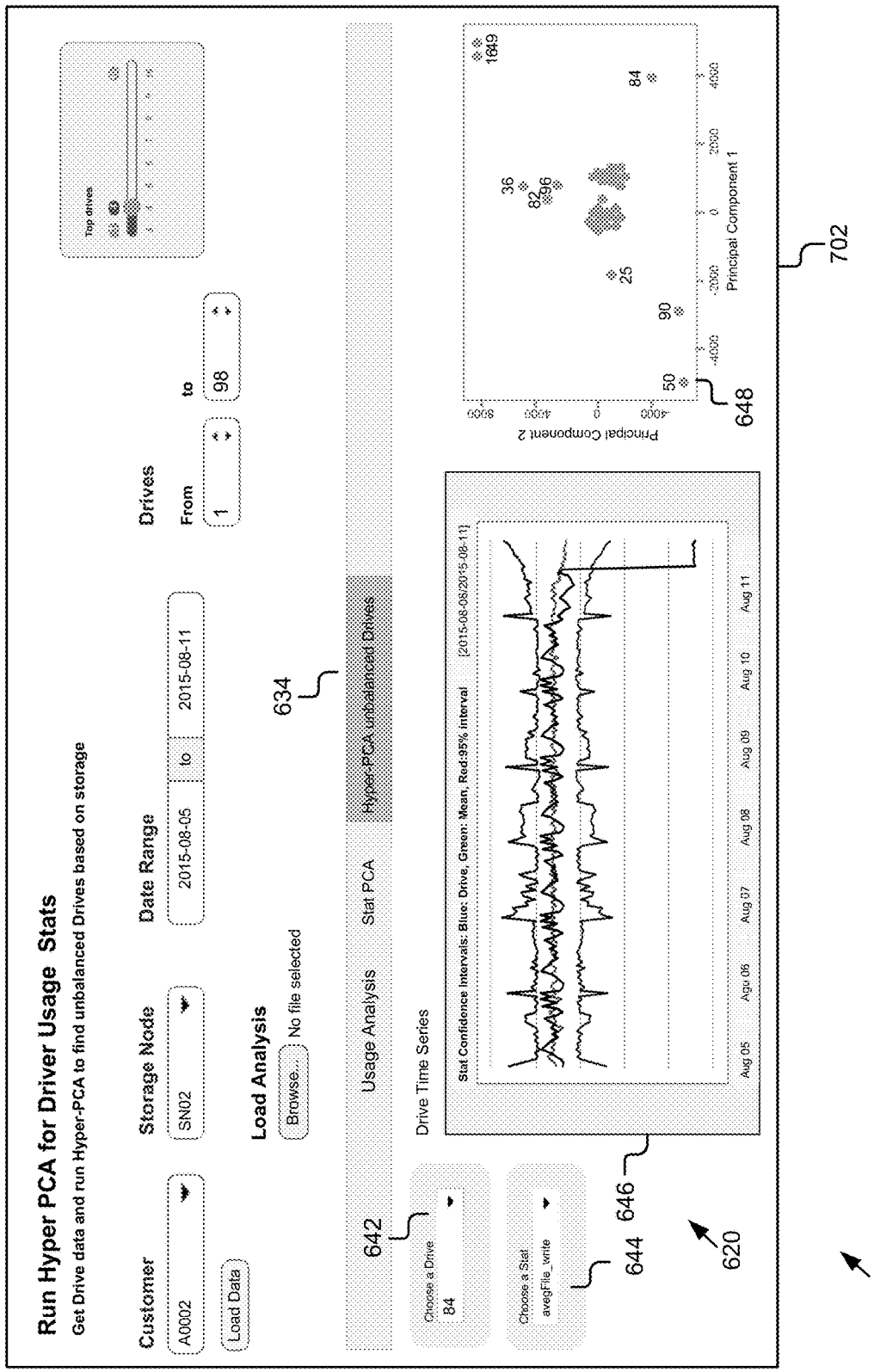
Figure 8:
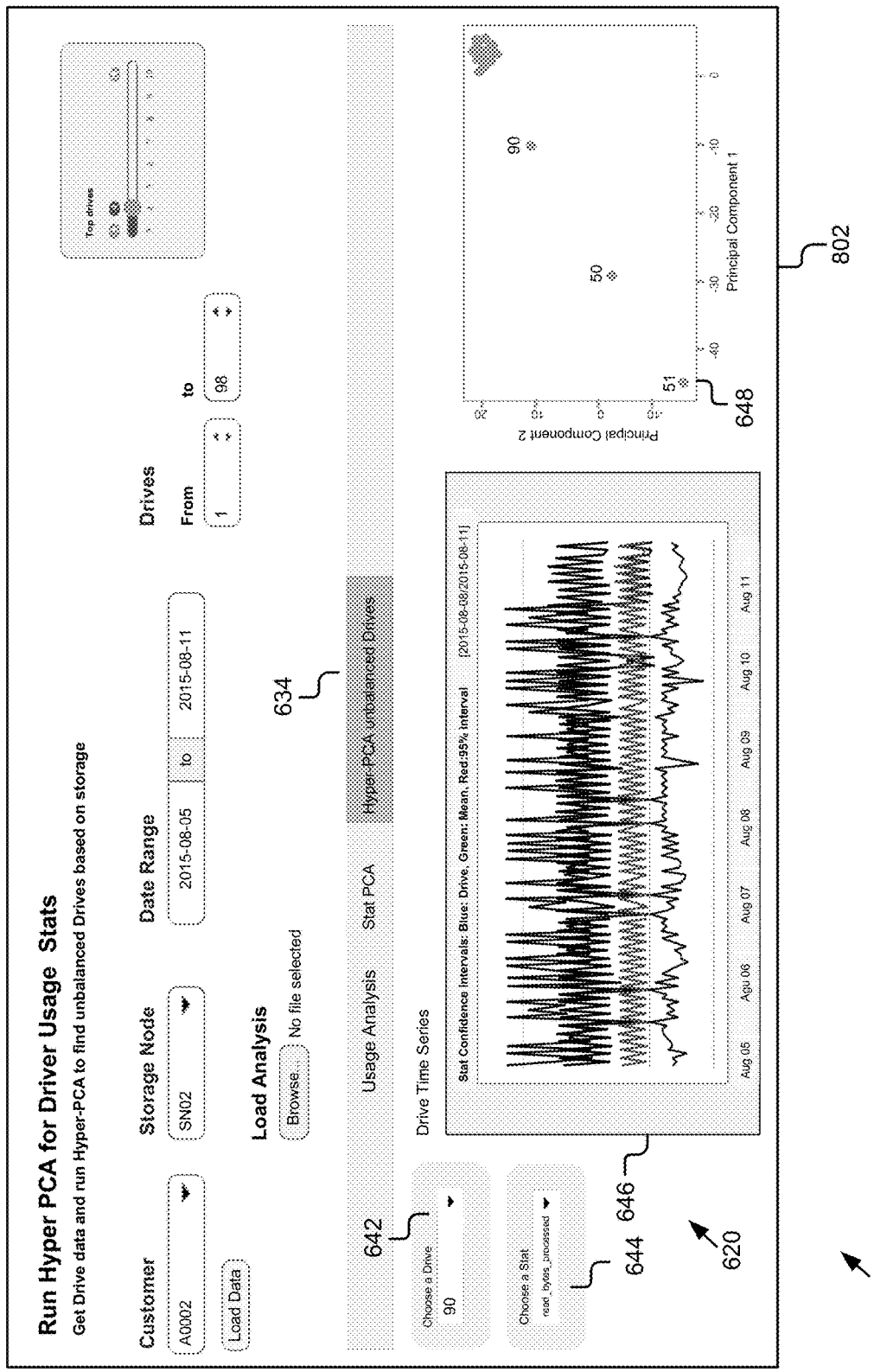

FIGS. 6, 7, and 8 are graphical representations of a graphical user interface 600, which presents analytics generated based on analysis results. Interface 600 includes a configuration region 602 including a customer selector 604, a storage node selector 606, a date selector 608, storage device (e.g., drive) selector 610, and a storage device (e.g., drive) filter 612. The customer selector 604 is populated with one or more customers that the user is authorized to support. Based on the selection in 604, the storage node selector 606 is populated with corresponding storage device data. For example, the storage node selector 606 is populated with storage node entries associated with customer A0002 in a reference table.

The user may select a storage node of interest from among the storage nodes listed in a content region (e.g., drop down menu) of the storage node selector 606. Based on that selection, the storage device selector 610 is populated with the storage devices mounted in the selected storage node. The analytics displayed in the analytics region 620 are rendered based on the values configured in the configuration region 602 and may include a usage analysis region 630 including corresponding data, a statistical PCA region 632 (selected in FIG. 6), and a hyper-PCA unbalanced storage devices (e.g., drives) region 634 (selected in FIGS. 7 and 8). The user may filter the analytics to a certain date rage using the date selector 608 and may limit the number of outlying top storage devices using the storage device (e.g., drive) filter 612.

The analytics region 620 in FIG. 6 includes a top storage devices (e.g., drives) region 622 displaying the top (most) unbalanced storage devices relative to the other storage devices in the storage node, a scores region 624 displaying the corresponding scores for the top storage devices (e.g., drives), a statistical region 626 displaying the statistics associated with the top storage devices, and a visualization 628 showing a distribution of the storage devices illustrating the top storage devices as outliers. In this example, the visualization is a scatterplot with the principal components from the PCA as axes.

In FIGS. 7 and 8, the unbalanced storage devices (e.g., drives) region 634 is selected. In the unbalanced storage devices region, the user may select a specific unbalanced storage device using the storage device (e.g., drive) selector 642 and specific statistic using statistic selector 644. Corresponding data showing anomalous behavior based on that selection is populated in visualization region 646. Further, visualization region 648 is populated with the storage device distribution for the selected statistic. For example, data for storage device 84 and statistic avegFile_write is depicted in FIG. 7, and data for storage device 90 and statistic read_bytes_processed is depicted in FIG. 8. These analytics allow a user to quickly determine the reasons for the anomalous behavior and address them. In some cases, various storage nodes may each include numerous storage devices (e.g., 100+) capable of storing and retrieving petabytes or more of data. As described above, the technology described herein is capable of regularly (e.g., every 15 min.) or continuously receiving signal data from these nodes over a given period of time (e.g., a week), generating hyper analysis results that isolate regions of interests for storage devices exhibiting anomalous behavior, and notifying stakeholders of anomalies so they can be immediately addressed before catastrophic failure occurs.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A computer-implemented method comprising:
    collecting, at one or more computing devices, signal data for a plurality of non-transitory storage devices, the signal data including time series for statistics associated with each of the non-transitory storage devices;
    determining, using the one or more computing devices, a hyper feature representation from the collected signal data;
    computing, using the one or more computing devices and the hyper feature representation, scores for each of the statistics associated with each of the non-transitory storage devices;
    determining, using the one or more computing devices, a reduced hyper feature representation aggregating the scores for each of the statistics associated with each of the non-transitory storage devices;
    generating, using the one or more computing devices and the reduced hyper feature representation, storage device scores for the non-transitory storage devices of the plurality, respectively; and
    identifying, using the one or more computing devices, one or more non-transitory storage devices from among the plurality of non-transitory storage devices exhibiting anomalous storage device behavior using the storage device scores.

2. A computer-implemented method comprising:
    determining, using one or more computing devices, a hyper feature representation aggregating scores for statistics associated with a plurality of non-transitory storage devices, wherein the hyper feature representation is a reduced hyper feature representation based on an initial hyper feature representation;
    generating, using the one or more computing devices and the hyper feature representation, storage device scores for the non-transitory storage devices of the plurality of non-transitory storage devices, respectively; and
    identifying, using the one or more computing devices, one or more non-transitory storage devices from among the plurality of non-transitory storage devices exhibiting anomalous storage device behavior using the storage device scores.

3. A system comprising:
    one or more processors;
    one or more memories; and
    an analyzer configured to perform operations including:
        determining a hyper feature representation aggregating scores for statistics associated with a plurality of non-transitory storage devices, wherein the hyper feature representation is a reduced hyper feature representation based on an initial hyper feature representation;

generating, using the hyper feature representation, storage device scores for the non-transitory storage devices of the plurality of non-transitory storage devices, respectively; and identifying one or more non-transitory storage devices from among the plurality of non-transitory storage devices exhibiting anomalous storage device behavior using the storage device scores.

4. The computer-implemented method of claim 2, further comprising:

ranking the non-transitory storage devices using the storage device scores.

5. The computer-implemented method of claim 2, further comprising:

generating analytics identifying regions of interest for each of the non-transitory storage devices; and providing the analytics for presentation by a client device of a stakeholder.

6. The computer-implemented method of claim 2, further comprising:

computing, using the one or more computing devices and the initial hyper feature representation, the scores for the statistics associated with the plurality of non-transitory storage devices, wherein:

the initial hyper feature representation is a two-dimensional matrix including a time series for the statistics associated with the non-transitory storage devices.

7. The computer-implemented method of claim 2, wherein the storage device scores are feature vectors having dimensions equal to a number of statistics used to determine the scores.

8. The computer-implemented method of claim 7, wherein each feature vector of the feature vectors includes a ranking of the statistics corresponding to that feature vector.

9. The computer-implemented method of claim 2, further comprising:

computing the scores for the statistics associated with the plurality of non-transitory storage devices, wherein computing the scores for the statistics includes performing hierarchical clustering to determine statistical significance of statistical values of the statistics.

10. The computer-implemented method of claim 2, further comprising:

computing the scores for the statistics associated with the plurality of non-transitory storage devices, wherein computing the scores for the statistics includes fitting a multivariate t distribution to the scores.

11. The computer-implemented method of claim 2, further comprising:

computing, using the one or more computing devices and the initial hyper feature representation, the scores for the statistics associated with the plurality of non-transitory storage devices, wherein the initial hyper feature representation is determined using principal component analysis while preserving a time series of the statistics associated the plurality of non-transitory storage devices.

12. The computer-implemented method of claim 2, wherein the hyper feature representation is determined using principal component analysis.

13. A system comprising:

one or more processors; and one or more memories storing instructions that, when executed by the one or more processors, cause the system to perform operations comprising:

collecting signal data for a plurality of non-transitory storage devices, the signal data including time series for statistics associated with each of the non-transitory storage devices;

determining a hyper feature representation from the collected signal data;

computing, using the hyper feature representation, scores for each of the statistics associated with each of the non-transitory storage devices;

determining a reduced hyper feature representation aggregating the scores for each of the statistics associated with each of the non-transitory storage devices;

generating, using the reduced hyper feature representation, storage device scores for the non-transitory storage devices of the plurality, respectively; and identifying one or more non-transitory storage devices from among the plurality of non-transitory storage devices exhibiting anomalous storage device behavior using the storage device scores.

14. The system of claim 3, wherein the analyzer is further configured to perform operations comprising:

ranking the non-transitory storage devices using the storage device scores.

15. The system of claim 3, wherein the analyzer is further configured to perform operations comprising:

generating analytics identifying regions of interest for each of the non-transitory storage devices; and providing the analytics for presentation by a client device of a stakeholder.

16. The system of claim 3, wherein the analyzer is further configured to perform operations comprising:

computing, using the initial hyper feature representation, the scores for the statistics associated with the plurality of non-transitory storage devices, wherein the initial hyper feature representation is a two-dimensional matrix including a time series for the statistics associated with the non-transitory storage devices.

17. The system of claim 3, wherein the storage device scores are feature vectors having dimensions equal to a number of statistics used to determine the scores.

18. The system of claim 17, wherein each feature vector of the feature vectors includes a ranking of the statistics corresponding to that feature vector.

19. The system of claim 3, wherein the analyzer is further configured to perform operations comprising:

computing the scores for the statistics associated with the plurality of non-transitory storage devices, wherein computing the scores for the statistics includes performing hierarchical clustering to determine statistical significance of statistical values of the statistics.

20. The system of claim 3, wherein the analyzer is further configured to perform operations comprising:

computing the scores for the statistics associated with the plurality of non-transitory storage devices, wherein computing the scores for the statistics includes fitting a multivariate t distribution to the scores.

21. The system of claim 3, wherein the analyzer is further configured to perform operations comprising:

computing, using the initial hyper feature representation, the scores for the statistics associated with the plurality of non-transitory storage devices, wherein the initial hyper feature representation is determined using principal component analysis while preserving a time series of the statistics associated the plurality of non-transitory storage devices.

22. The system of claim 3, wherein the hyper feature representation is determined using principal component analysis.

23. A system comprising:
one or more processors;
one or more memories;
means for collecting signal data for a plurality of non-transitory storage devices, the signal data including time series for statistics associated with each of the non-transitory storage devices;
means for determining a hyper feature representation from the collected signal data;
means for computing, using the hyper feature representation, scores for each of the statistics associated with each of the non-transitory storage devices;
means for determining a reduced hyper feature representation aggregating the scores for each of the statistics associated with each of the non-transitory storage devices;
means for generating, using the reduced hyper feature representation, storage device scores for the non-transitory storage devices of the plurality, respectively; and
means for identifying one or more non-transitory storage devices from among the plurality of non-transitory storage devices exhibiting anomalous storage device behavior using the storage device scores.

* * * * *